United States Patent
Quartarone et al.

(10) Patent No.: US 6,301,918 B1
(45) Date of Patent: *Oct. 16, 2001

(54) FROZEN CARBONATED BEVERAGE DISPENSING APPARATUS

(75) Inventors: Daniel S. Quartarone, Stone Mountain; Michael Riley, Alpharetta; Richard Staten, Roswell, all of GA (US)

(73) Assignee: The Coca-Cola Company, Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/404,286

(22) Filed: Sep. 23, 1999

(51) Int. Cl.$^7$ .................................................. A23G 9/00
(52) U.S. Cl. .............................................. 62/342; 366/296
(58) Field of Search .................... 62/342, 343; 366/293, 366/295, 296, 143, 169.1, 170.2

(56) References Cited

U.S. PATENT DOCUMENTS

| | | | |
|---|---|---|---|
| 2,835,589 | * | 5/1958 | Whitfield .............................. 366/318 |
| 3,050,960 | * | 8/1962 | Cfifford ................................. 62/342 |
| 3,924,842 | * | 12/1975 | Klein et al. .......................... 366/295 |
| 4,232,973 | * | 11/1980 | Ligouzat ............................... 366/293 |
| 4,364,666 | | 12/1982 | Keyes . |
| 4,708,489 | | 11/1987 | Carlson . |
| 4,964,542 | | 10/1990 | Smith . |
| 5,016,446 | | 5/1991 | Fiedler . |
| 5,323,691 | | 6/1994 | Reese et al. . |
| 5,463,877 | | 11/1995 | Young et al. . |
| 5,692,392 | | 12/1997 | Swier . |
| 5,706,661 | | 1/1998 | Frank . |
| 6,058,721 | | 5/2000 | Midden et al. . |

FOREIGN PATENT DOCUMENTS

| | | |
|---|---|---|
| 11-169093 | 6/1999 | (JP) . |
| 11-262360 | 9/1999 | (JP) . |
| 11-262361 | 9/1999 | (JP) . |

* cited by examiner

Primary Examiner—Corrine McDermott
Assistant Examiner—Mohammad M Ali
(74) Attorney, Agent, or Firm—Finnegan, Henderson, Farabow, Garrett & Dunner, L.L.P.

(57) ABSTRACT

An improved frozen carbonated beverage dispenser is provided with the beverage product including improved integrity and the apparatus including improved sanitation, product visualization, and low profile features. The dispenser includes a cylindrical auger chamber formed as a sleeve with sealed ends, within which a mixing auger (screw) is contained. The mixing auger is driven rotationally from an external source and acts to mix and transfer (pump) chilled/frozen products, such as beverage products, in the chamber. The mixing auger contains a central conduit or bore through its central axis acting as a return passage for mixed product. Product is dispensed from within the mixing chamber by use of a dispensing lever assembly.

8 Claims, 3 Drawing Sheets

FROZEN CARBONATED BEVERAGE DISPENSING APPARATUS

TECHNICAL FIELD

The present invention relates generally to beverage dispensing, and particularly relates to a method and apparatus for dispensing partially frozen beverages.

BACKGROUND OF THE INVENTION

Dispensers for beverages for human consumption are well known in the art. Such dispensers include those which can dispense beverages including frozen water or frozen beverage.

By way of example only, U.S. Pat. No. 5,692,392 to Swier, entitled "Soft Frozen Beverage Dispenser Apparatus and Method", discloses a portable soft frozen beverage dispenser apparatus having a housing supported on wheels and having a refrigerated storage tank for the storage of a soft frozen beverage therein and having a motor driven rotating mixing blade within the tank. A refrigerated dispenser storage tank is used for further storage and dispensing of the soft frozen beverage and also has a rotating mixing blade therein. Tubing connects the refrigerated storage tank with the dispenser storage tank through a motor driven pump which pumps the soft frozen beverage from the storage tank to the dispenser storage tank while a second tubing recirculates the soft frozen beverage from the dispenser storage tank back to the refrigerated storage tank. A nozzle in the dispenser storage tank dispenses the soft frozen beverage so that a stored soft frozen beverage can be rapidly dispensed from a wheeled storage vehicle. The method includes selecting the apparatus for a portable soft frozen beverage dispenser, filling the refrigerated storage tank with a soft frozen beverage and pumps the soft frozen beverage to the dispenser storage tank where the soft frozen beverage is dispensed and recirculates the soft frozen beverage whenever the pump is operating.

U.S. Pat. No. 4,964,542 to Smith, entitled "Frozen Beverage Dispenser", discloses frozen beverage dispenser for use with a liquid/ice slurry machine which freezes a liquid to form a slurry and continuously circulates the slurry through the machine for maintaining the slurry in the desired state. The dispenser includes a nozzle connected to the machine by a flexible line having concentric inner and outer tubes, with the slurry being continuously circulated through the line between the machine and the nozzle. The nozzle has a flow path therethrough with the line connected at one end of the flow path and with a valve for controlling flow out the other end, and a bypass passage between the inner and outer tubes for return flow of the slurry when the valve is closed.

U.S. Pat. No. 5,706,661 to Frank, entitled "Apparatus and Method for Controlling the Consistency and Quality of a Frozen Carbonated Beverage Product". discloses an apparatus and method are provided for controlling the consistency and quality of a frozen carbonated beverage product made by mixing several ingredients including syrup, water and carbon dioxide in a mixing chamber of a frozen carbonated beverage machine. The apparatus includes a process flow block that controls the flow of the ingredients from ingredient supply sources to the mixing chamber. A pair of transducers are also provided for measuring the pressure of carbon dioxide being injected into the mixing chamber and the pressure of the product in the mixing chamber. A central processing unit communicates the measured pressures to an EPROM which employs an algorithm for determining a low set point pressure value and a high set point pressure value based upon the pressure of carbon dioxide being injected into the mixing chamber. A pair of solenoids are also provided which control the supply of the ingredients into the mixing chamber in response to command signals from the central processing unit. The central processing unit instructs one or both of the solenoids to open so as to supply the mixing chamber with one or more of the ingredients when the pressure in the mixing chamber is below the low set point pressure value and to close so as to cut off the supply of one or more of the ingredients to the mixing chamber when the pressure in the mixing chamber is above the high set point pressure value.

U.S. Pat. No. 5,323,691 to Reese, entitled "Frozen Drink Mixer", discloses an apparatus for preparing blended beverages, particular frozen drinks, in which an ice dispenser, liquid mix dispenser and blender unit are combined in a single unit. A programmable timing mechanism regulates the period of time the ice dispenser, liquid mix dispenser and the blender unit operate, so that an operator needs to only push momentary push buttons to effect operation of the apparatus. The apparatus will automatically deliver an appropriate amount of ice and liquid to the blender unit and will turn on the blender at the appropriate time and for the appropriate amount of time to prepare a frozen drink of desired size.

Although the above disclosures may include advantages, needs always exist in the art to provide an improved frozen carbonated beverage dispenser.

SUMMARY OF THE INVENTION

The present invention overcomes deficiencies in the prior art by providing an improved frozen carbonated beverage dispenser, with the beverage product including improved integrity and the apparatus including improved sanitation, product visualization, and low profile features.

Generally described, the present invention is directed towards an apparatus for dispensing frozen beverages, the apparatus comprising a housing defining a cavity therein, a mixing auger having at least one external mixing fin, and an internal bore extending substantially the length of the auger, wherein at least partially frozen beverage is mixed by the outer fins and returns within the hollow bore.

Therefore, it is an object of the present invention to provide an improved frozen carbonated beverage.

Therefore, it is an object of the present invention to provide an improved frozen carbonated beverage with improved integrity.

It is a further object of the present invention to provide an improved frozen carbonated beverage dispenser.

It is a further object of the present invention to provide an improved frozen carbonated beverage dispenser which is simple in operation.

It is a further object of the present invention to provide an improved frozen carbonated beverage dispenser which provides improved product visualization features.

It is a further object of the present invention to provide an improved frozen carbonated beverage dispenser which provides improved sanitation features.

It is a further object of the present invention to provide an improved frozen carbonated beverage dispenser which provides low profile features.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Figure 1:
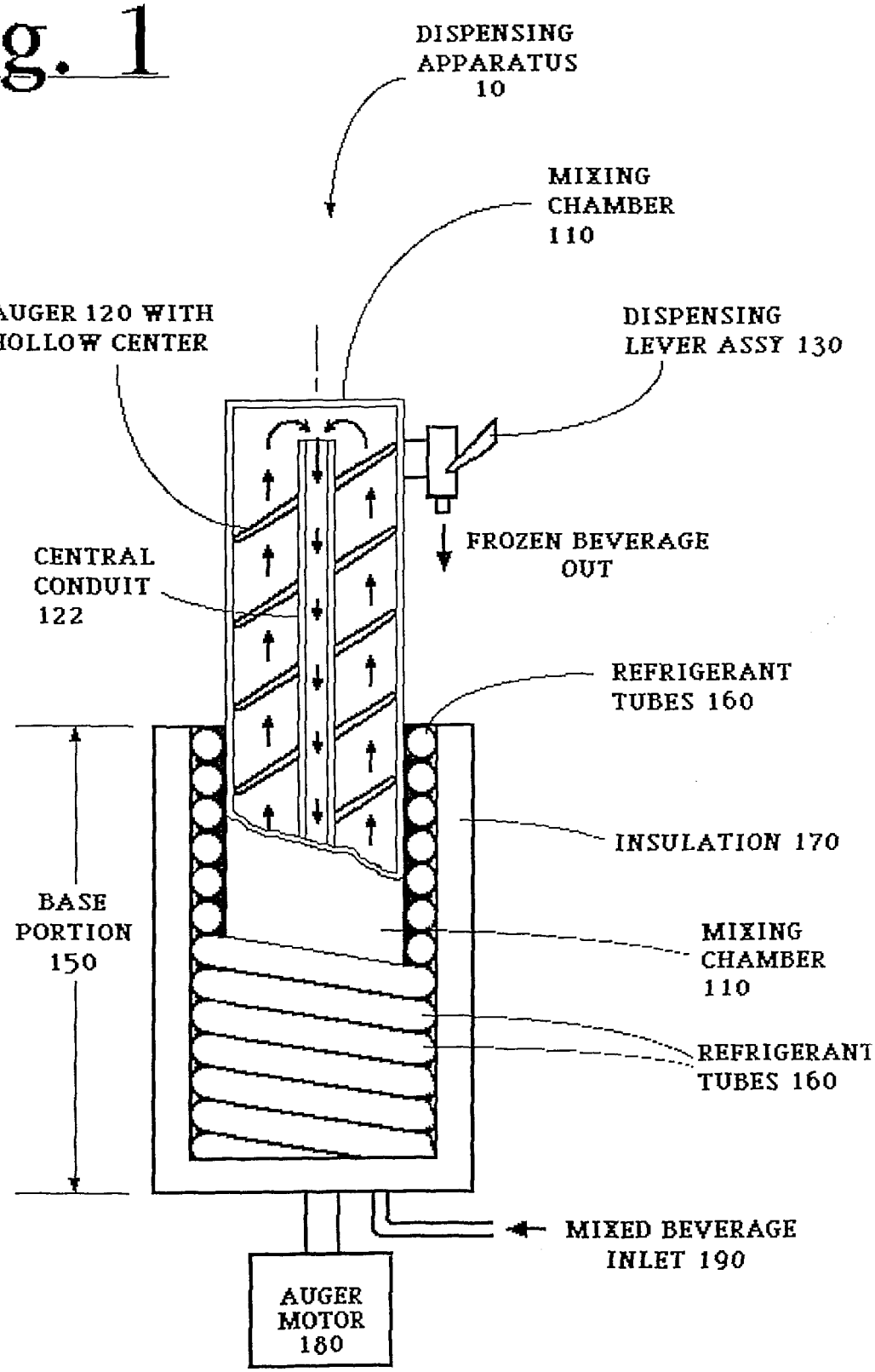
FIG. 1 is an illustrative side view of an exemplary dispensing apparatus in accordance with the invention.

Reference is now made to the drawings, in which like numerals indicate like elements throughout the several views.

General Description

Generally described, the apparatus 100 according to the present invention includes a cylindrical mixing chamber 110 formed as a sleeve with sealed ends, within which a vertical mixing auger 120 (a.k.a. screw) is contained. The mixing auger 120 is driven rotationally from an external source and acts to mix and transfer (pump) chilled/frozen products, such as beverage products, in the chamber. The mixing auger 120 contains a central conduit or bore 122 through its vertical central axis acting as a return passage for mixed product.

Product is dispensed from within the chamber 110 by use of a dispensing lever assembly 130.

The Various Elements

Figure 2:
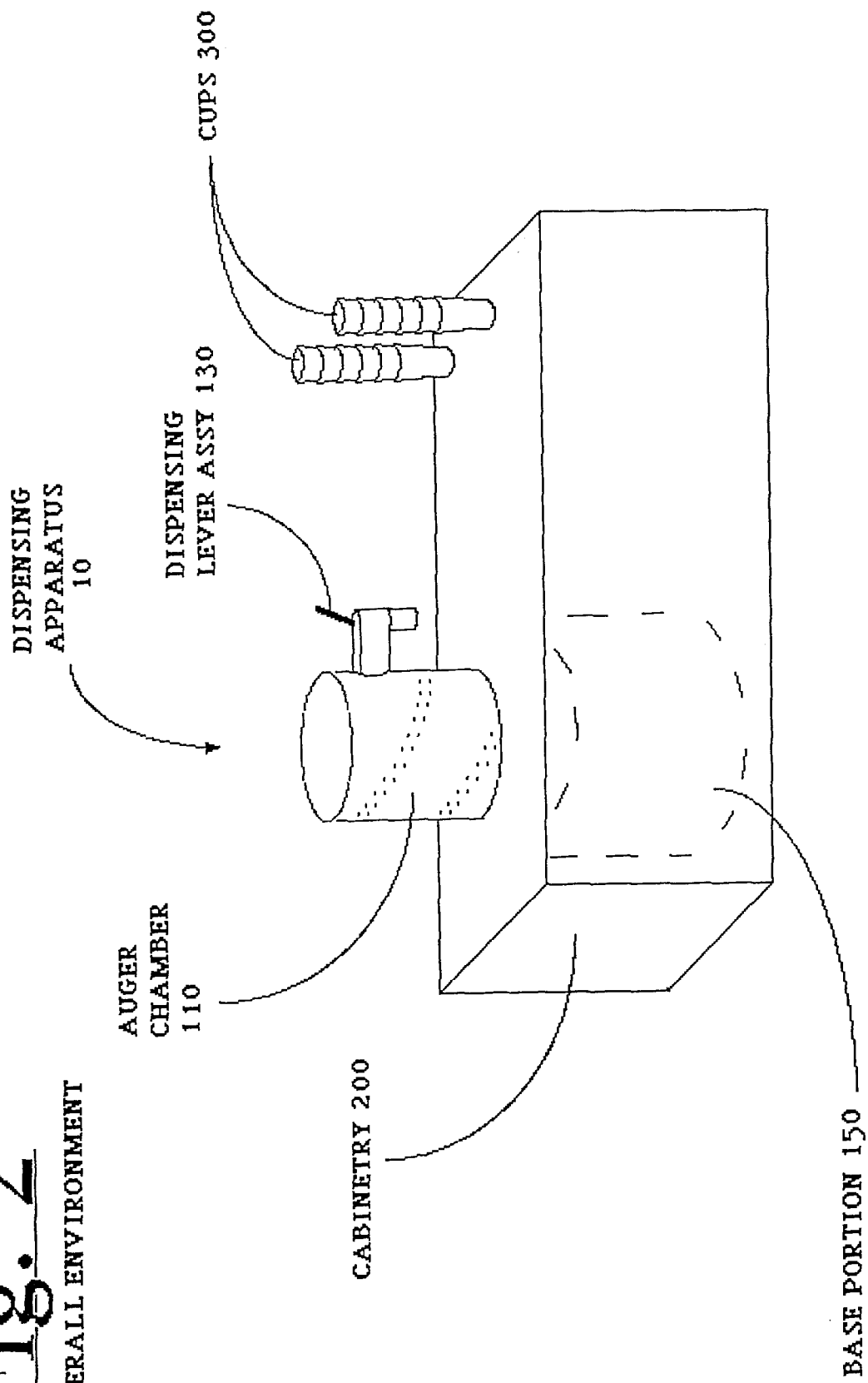
FIG. 2 illustrates an exemplary dispensing apparatus in accordance with the invention in a conventional retail environment.

FIG. 1 is an illustrated view of an exemplary dispensing apparatus used with the general environment of FIG. 2. The apparatus 100 includes a mixing chamber 110, a mixing auger 120 with a central tube 122, a dispensing lever assembly 130, and a base portion 150. The apparatus further includes refrigerant tubes 160, insulation 170, a motor 180, a drive coupling 181, and a mixed beverage inlet 190. The conventional retail environment illustrated in FIG. 2 shows the apparatus in combination with cabinetry 200 and dispensing containers 300, such as cups.

The Mixing Chamber

Figure 3:
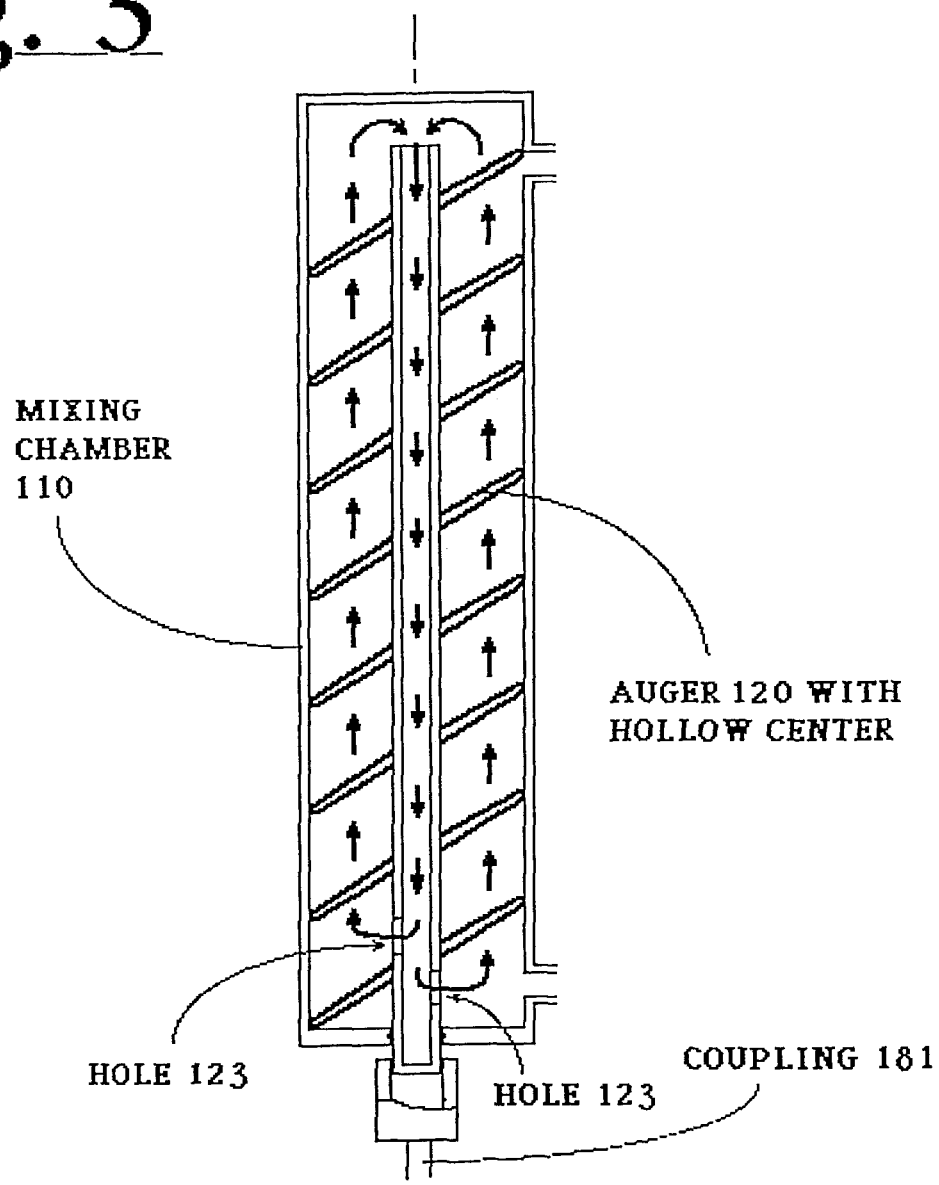
FIG. 3 shows a cross-sectional side view of an exemplary dispensing apparatus in accordance with the invention.

The mixing chamber 110, shown also in FIG. 3, is generally cylindrical and defines an interior mixing cavity which accepts a mixing auger and the beverage product. In one embodiment, the walls of the mixing chamber are at least partially transparent to allow for product mixing to be viewed by the consumer.

The mixing chamber 110 includes an inlet 190 and an outlet 130, discussed in detail later.

The Mixing Auger

The screw-like mixing auger 120 is configured to be located within the cavity defined by the mixing chamber 110, and to be rotated by a motor 190 as discussed later.

The mixing auger 120 includes a central tube 122 defining a bore which serves a dual purpose of providing support for the mixing auger fins but also allows for mixed product to be recirculated from the upper end of the mixing chamber to the lower end. Holes 123 can be used in the central tube to allow for product return.

In the preferred embodiment, the mixing auger can be understood to be a vertical mixing auger, rotating about a generally vertical mixing axis and rotating within a generally vertically oriented elongate mixing chamber 110.

Dispensing Lever Assembly

The dispensing lever assembly 130 is configured to provide a means of dispensing frozen carbonated beverage from within the chamber 110.

The Base Portion

The base portion 150 includes elements such as the refrigerant tubes 160, insulation 170, the motor 180, a drive coupling 181 (intermediate the motor and the mixing auger) and a mixed beverage inlet 190. It may be understood that such elements do not need to be in the view or accessed by the typical consumer, and so under the embodiment shown in FIG. 2, the base portion is shown within a typical base cabinet within the retail environment, to be accessed by authorized personnel as needed.

Chilling

Chilling is accomplished by passing refrigerated media through an evaporator or heat exchange coil in contact with a product heat exchange surface. Refrigeration is supplied to the evaporator from either a remote chilling unit or from the onboard unit located below the chamber within the cabinetry. Refrigeration may utilize hermetic, semi-hermetic vapor compression type systems or chilled media (coolant) based systems.

Product ingredients are regulated into the chamber with a direct injection technique to eliminate the blend chamber (hopper & valve assemblies). The use of a sealed system includes CIP (clean in place) capability.

One embodiment of the device utilizes the chamber walls (or a portion of them) as the primary heat transfer surface between the product and the chilling media.

A second embodiment of the design (not shown) utilizes the product return conduit surfaces as the means for heat transfer between the product and the chilling media.

Operation

As may be understood, the drive motor 180 drives the auger 120, such that beverage is mixed and transferred down through the central conduit 122 and up around the outside of the auger 120 within the chamber 110. Product may be dispensed as desired by use of the dispensing lever assembly 130.

Alternatives

It should be understood that the present invention contemplate the use of other types of evaporators besides that shown in the figures. A wide variety of cooling sources could also be used without departing from the spirit and scope of the present invention.

Alternate auger drive mechanisms are also contemplated under the present invention, such as but not limited to magnetic drive configurations which could eliminate the need for a shaft passing through the lower wall of the container, likewise eliminating the resultant sealing difficulties.

Rotational direction of the mixing auger and resultant flow direction within the mixing chamber may like be reversed from that shown without departing from the spirit and scope of the present invention.

Figure 4:
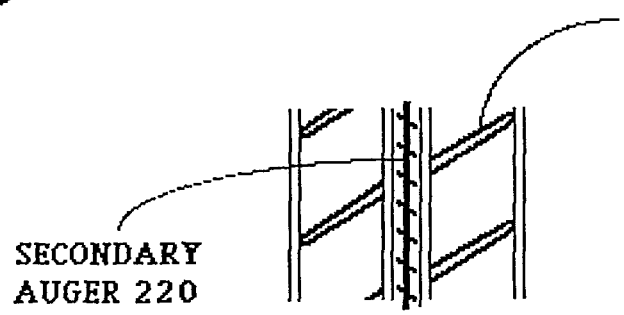
FIG. 4 shows a cross-sectional side view of an alternate embodiment of a dispensing apparatus in accordance with the invention.

Furthermore, as shown in FIG. 4, an alternative dispensing apparatus in accordance with the invention may include an additional auger 220 positioned within the central longitudinal bore 122 of the mixing auger 120 to encourage flow therein.

Mixing may also be completely done within the mixing chamber, by supplying the mixing chamber with more than one inlet, with each inlet configured to supply a different drink component. Such inlets could be located at the top in the view of the consumer for marketing reasons.

The motor could also be on the top or bottom, or could include a gear on top going down to the motor.

Other objects, features, and advantages of the present invention will become apparent upon reading the following detailed description of the preferred embodiment of the invention when taken in conjunction with the drawing and the appended claims.

Conclusion

Therefore it may be seen that the present invention provides an improved apparatus for dispensing a frozen carbonated beverage product. The beverage product includes improved integrity and the apparatus includes improved sanitation, product visualization, and low profile features.

While this invention has been described in specific detail with reference to the disclosed embodiments, it will be understood that many variations and modifications may be effected within the spirit and scope of the invention as described in the appended claims.

We claim:

1. An apparatus for dispensing frozen beverages, said apparatus comprising:

a housing defining a cavity therein;

a mixing auger having at least one external mixing fin and an internal bore extending substantially the length of said auger, the internal bore being in fluid communication with the cavity: and a second auger located within and rotatable relative to the internal bore of the mixing auger, wherein the mixing auger is configured to mix an at least partially-frozen beverage and urge the beverage in a first direction, and wherein the second auger is configured to urge the beverage within said hollow bore in a second direction opposite the first direction.

2. The apparatus for dispensing frozen beverage as claimed in claim 1, wherein said housing has a transparent portion allowing for the external viewing of said mixing.

3. The apparatus for dispensing frozen beverages as recited in claim 1 further comprising a motor for rotating said mixing auger about said vertical axis.

4. An apparatus for dispensing frozen beverage said apparatus comprising:

a housing defining a cavity therein and having a transparent portion; and a mixing auger having at least one external mixing fin, and an internal bore extending substantially the length of said auger;

wherein an at least partially-frozen beverage is mixed by the at least one external fin and returned within said hollow bore, the transparent portion allowing for external viewing of said mixing.

5. A method of mixing and dispensing frozen beverages, said method comprising:

providing an apparatus including a housing defining a cavity therein, a mixing auger having an internal bore in fluid communication with the cavity, and a second auger located within the internal bore of the mixing auger;

mixing an at least partially-frozen beverage in the cavity;

urging the beverage in the cavity in a first direction;

dispensing an amount of the beverage from the cavity; and urging the beverage in the internal bore in a second direction opposite the first direction.

6. The method of claim 5, wherein the mixing auger includes at least one external mixing fin, and the mixing an at least partially-frozen beverage includes mixing the at least one partially-frozen beverage with the external mixing fin.

7. The method of claim 5, wherein the urging the beverage in a first direction includes urging the beverage with the mixing auger.

8. The method of claim 5, wherein the urging the beverage in a second direction includes urging the beverage with the second auger.

* * * * *

UNITED STATES PATENT AND TRADEMARK OFFICE
CERTIFICATE OF CORRECTION

PATENT NO. : 6,301,918 B1
DATED : October 16, 2001
INVENTOR(S) : Daniel S. Quartarone et al.

Page 1 of 1

It is certified that error appears in the above-identified patent and that said Letters Patent is hereby corrected as shown below:

Column 5, claim 1,
Line 22, "cavity:" should read -- cavity; --.

Column 5, claim 3,
Line 34, "1" should read -- 1, --.

Column 6, claim 4,
Line 1, "beverage" should read -- beverage, --.

Signed and Sealed this

Ninth Day of April, 2002

*Attest:*

JAMES E. ROGAN
*Director of the United States Patent and Trademark Office*

*Attesting Officer*